United States Patent Office 3,459,234
Patented Aug. 5, 1969

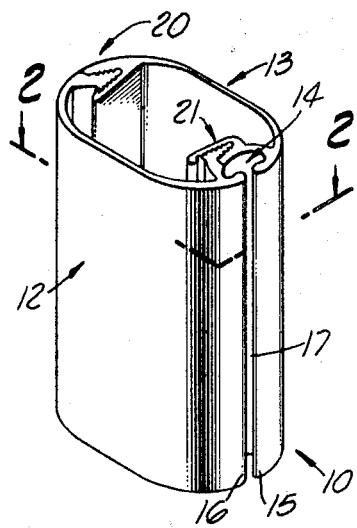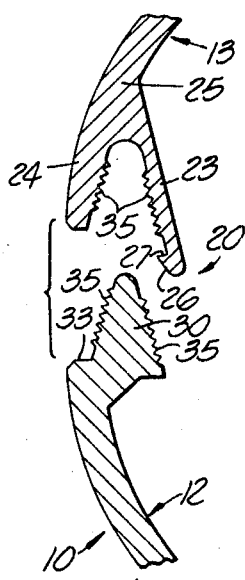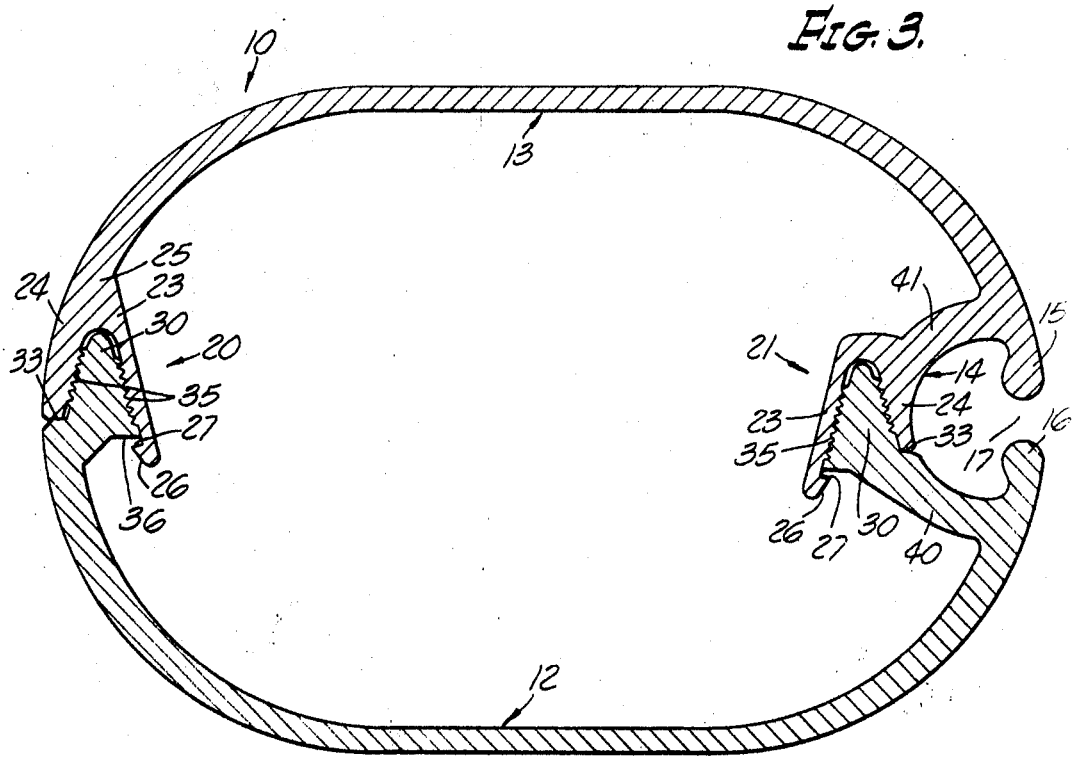

3,459,234
TWO-PIECE EXTRUDED TUBULAR ASSEMBLY
Robert L. Richter, 806 E. Leadora, Glendora, Calif.
91740, and Jack E. Sauter, 5235 N. Citrus, Azusa,
Calif. 91702
Filed Aug. 8, 1967, Ser. No. 659,097
Int. Cl. F16l 9/22, 9/06
U.S. Cl. 138—165                         10 Claims

ABSTRACT OF THE DISCLOSURE

A two-piece tubular assembly formed from a pair of extruded members of generally C-shape in cross-section having nesting edges one of which is generally V-shaped in cross-section and the other of which has a V-shaped tongue. The nesting surfaces of these complementally-shaped lateral edge portions are serrated and positively interlock as the parts are pressed together. The parts also cooperate upon assembly to form a captive raceway for sail keepers and the like fittings commonly used on sail craft. The nesting surfaces may be coated with adhesive or a strong bonding agent.

---

This invention comprises a two-piece tubular assembly formed from a pair of extruded members having first and second internesting and interlocking portions along either lateral edge designed to be internested by the application of pressure to the members. The interlocking portions are concealed within the exterior surface of the completed assembly and one of the joints forms part of a raceway extending lengthwise of the assembly and having a restricted opening facing outwardly and effective to retain sliding fixtures, such as those used in raising and lowering sail of a sailboat. The joints are positively interlocked both structurally and with a bonding agent.

The present invention provides an easily constructed, light weight, high strength composite tube formed with a raceway concealed within its interior and suitable for many uses. This tubular assembly is particularly adapted for use as a sailboat mast, the raceway formed along one edge being used to retain the keepers for the sail but it will be recognized that the structure is equally suitable for many other uses. In a typical embodiment the two extruded halves of the assembly are generally C-shaped in cross-section and designed for interlocking assembly facing one another to provide a tubular structure of elliptical shape in cross-section. The adjacent edges of the two members include a V-shaped flange cooperating with a V-shaped lug on the other member to internest snugly, the adjacent internested faces being provided with interlocking teeth. At least one leg of the V-shaped flange is longer and more flexible than the other and sufficiently resilient to permit temporary spreading of the legs sufficiently to accommodate the assembly operation. Further assurance against disassembly is provided by a bonding agent applied between the contacting surfaces of the internested joints and additionally by a locking detent means between the joint parts.

It is therefore a primary object of this invention to provide an improved composite tubular assembly formed from extruded components held rigidly joined together by a pair of interlocking joints.

Another object of the invention is the provision of a composite tubular mast assembly wherein the parts, when mated, cooperate to form a raceway having a restricted opening therefrom for sliding fittings and wherein the parts are held together by a pair of interlocking joints concealed within the mast.

Another object of the invention is the provision of a composite tubular assembly formed from a pair of generally C-shaped members provided along their juxtaposed lateral edges with interlocking V-shaped parts.

These and other more specific objects will appear upon reading the following specification and claims and upon considering in connection therewith the attached drawing to which they relate.

Referring now to the drawing in which a preferred embodiment of the invention is illustrated.

FIGURE 1 is a view in perspective of one typical embodiment of the invention in assembled condition;

FIGURE 2 is a cross-sectional view on an enlarged scale taken along line 2—2 on FIGURE 1; and FIGURE 3 is a fragmentary exploded view on an enlarged scale with parts broken away and showing details of the interlocking joint.

Referring to the drawing, and more particularly to FIGURE 1, there is shown a composite tubular assembly designated generally 10 embodying the principles of this invention. The tubular assembly there shown is particularly suitable for use as sailboat mast comprising a pair of elongated extruded members 12 and 13. As there shown each member is generally C-shaped in cross-section and cooperates, when assembled, to provide a rigid assembly of elliptical shape as is clearly evident from FIGURES 1 and 2.

Referring to FIGURE 2, it is pointed out that the right-hand lateral edges of members 12 and 13 are shaped to include a C-shaped raceway or track 14 the lips 15 and 16 of which are rounded and spaced to provide a restricted opening 17. It will be understood that a series of keepers or sliding fixtures suitably shaped to slide lengthwise of raceway 14 are held captive in this track and include shanks projecting outwardly through opening 17 for attachment to sail or the like.

The C-shaped members 12, 13 are rigidly interlocked in assembled condition by a pair of joint assemblies 20, 21 of generally similar construction and extending longitudinally and for the full length of each of these members. Joint 20 comprises a first portion consisting of a V-shaped flange having inner and outer legs 23, 24 diverging from their common connection 25 with the main body member 13. Leg 23 is substantially longer and thinner than leg 24 and has substantial flexibility and resiliency. Its outer end is provided with camming means 26 and a shoulder 27 which serves as a locking detent as will be described more fully presently.

The second portion of joint 20 comprises a generally V-shaped lug 30 offset inwardly from one lateral edge of member 12. The wider base end of lug 30 is integral with member 12 and includes a shoulder 33 against which the end of leg 24 abuts when the first and second portions of the joint are fully assembled.

The juxtaposed faces of legs 23, 24 and of lug 30 are formed with longitudinally extending V-shaped teeth 35 positioned and shaped to mesh with one another when the lug is fully and properly assembled within the V-shaped flange. At this time the end of leg 24 will be firmly seated against shoulder 33 and the base end of lug 30 will be in locking position relative to shoulder 27 extending along the outer end of leg 23. Additionally and preferably teeth 35 of lug 30 and legs 23 and 24 are coated with a suitable bonding agent, such as an epoxy resin, prior to the assembly operation. Accordingly the surfaces of the assembled joint are not only firmly and rigidly interlocked mechanically but the juxtaposed surfaces of the meshed teeth 35 are bonded together and sealed with a water-proof bonding agent adding greatly to the strength of the assembled joint and excluding moisture and foreign matter generally.

Joint 21 is substantially identical with joint 20 in construction and mode of assembly and, for this reason, the same reference numerals have been applied to the respective parts thereof. The only difference between the two joints is that lug 30 of joint 21 is supported on the inwardly curving portion 40 of raceway 14 and legs 23 and 24 of the V-shaped flange are supported on portion 41 of this raceway.

It will be understood that members 12 and 13 are preferably formed by extrusion utilizing extrudable material such as aluminum or an alloy of aluminum. Prior to assembly the teeth 35 of each joint are coated with a liberal application of bonding agent. One member, as 13, is then suitably supported in a jig and the other member 12 is advanced toward its assembly position in the manner indicated in FIGURE 3. Adequate pressure is applied across members 12 and 13 to force lugs 30 between the associated legs 23, 24 of the V-shaped flanges. During the assembly operation the camming surfaces 26 at the outer ends of the longer resilient legs 23 engage the adjacent teeth 35 of lugs 30. This engagement deflects the upper ends of legs 23 away from lugs 30 and prevents the teeth on legs 23 having any substantial contact with those on the adjacent surface of lugs 30. There may be some engagement between the teeth on the outer sides of lugs 30 with those on the thicker leg 24 but this contact tends to flex the opposite lateral edges of member 12 toward one another while simultaneously deflecting legs 24 of member 13 away from one another to the slight extent necessary to permit full nesting assembly at the first and second components of the two joints. As final nesting occurs, the thicker base ends of lugs 30 snap beneath locking shoulders 27 on legs 23. The bonding agent is then allowed to cure, an operation which may be, and preferably is, facilitated by placing the tubular assembly in an oven or other heated room until the bonding agent is cured. The assembly is now complete and ready for use.

While the particular two-piece extruded tubular assembly herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

We claim:

1. A composite tubular asembly comprising a pair of elongated extruded members generally C-shaped in cross-section and having first and second portions along their respective juxtaposed lateral edges adapted to be press-assembled into interlocking engagement, said first and second portions including a V-shaped lug extending along the lateral edge of one of said C-shaped members and nestable between the complementally-shaped inner surfaces of the legs of a V-shaped flange integral with and extending along the lateral edge of the other of said C-shaped members, a plurality of complementally-shaped teeth extending along the adjacent surfaces of said lug and legs of said V-shaped flange positioned to mate with one another and lock said first and second portions positively and snugly assembled in the fully nested positions of said first and second portions, one leg of said V-shaped flange being relatively more flexible and resilient than the other and capable of deflection to permit spreading of the legs of said V-shaped flange while said lug is being pressed therebetween during the assembly operation.

2. A tubular asembly as defined in claim 1 characterized in the provision of a shoulder along the base end of said V-shaped lug position to interlock with the outer end of the outer leg of the V-shaped flange and lock said first and second portions against disassembly when said first and second portions are properly assembled relative to one another.

3. A tubular assembly as defined in claim 1 characterized in that one of the legs of said V-shaped flange is substantially longer than the other leg, the outer end of said longer leg having camming means facing toward the adjacent side of said V-shaped lug effective to engage the teeth on the adjacent face of said lug as the lug is being pressed into said V-shaped flange and to deflect said longer leg to hold said last mentioned teeth substantially disengaged during the assembly of said first and second portions and to permit internesting of said teeth at the end of the assembly operation.

4. A tubular assembly as defined in claim 3 characterized in the provision of shoulder means extending along the outer end of said longer leg positioned to engage over the base end of said V-shaped lug and lock the same against disassembly from said V-shaped flange.

5. A tubular assembly as defined in claim 1 characterized in that one lateral edge of each of said C-shaped members cooperates when assembled to form a C-shaped raceway having a restricted slot-like opening facing outwardly along the full length of said tubular assembly, and the adjacent ones of said first and second interlocking positons being integral with a respective part of said C-shaped raceway.

6. A composite hollow assembly comprising a pair of elongated extruded members adapted to have one pair of juxtaposed lateral edges pressed into edgewise positively interlocked assembly and so shaped as to cooperate in forming a raceway therebetween having an outwardly facing restricted slot-like opening extending lengthwise of said hollow assembly, the portion of said C-shaped raceway remote from said restricted opening having first and second portions integral with a respective one of said elongated members and extending lengthwise therealong, said first portion comprising a V-shaped flange provided with rows of teeth extending lengthwise along the interior surfaces of said V-shaped flange, said second portion having a V-shaped lug provided with rows of teeth along the sides thereof and shaped to mate and interlock with said first mentioned teeth when said lug and V-shaped flange are fully assembled in mating relationship.

7. A composite assembly as defined in claim 6 characterized in that one leg of said V-shaped flange is longer than the other leg and formed along its outer end with cam means effective to hold portions of said mating teeth substantially disengaged until said first and second portions are substantially in fully assembled position.

8. A composite assembly as defined in claim 6 characterized in the provision of locking detent means along the outer end of one leg of said V-shaped flange positioned to interlock with the base end of said V-shaped lug when said first and second portions are fully assembled thereby to lock these portions against disassembly.

9. A composite assembly as defined in claim 6 characterized in that said elongated members have their other lateral edges positioned in juxtaposition to one another and respectively shaped similarly to said first and second portions and including a toothed V-shaped flange interlocked with the teeth of a V-shaped lug.

10. A composite assembly as defined in claim 9 characterized in that said assembly is generally elliptical in cross-section with the longer diameter thereof passing through the respective pairs of interlocked first and second portions.

References Cited

UNITED STATES PATENTS

| Re. 24,613 | 3/1959 | Hageltorn | 138—165 |
| 1,891,740 | 12/1932 | Westerman | 138—165 |
| 1,984,232 | 12/1934 | Peremi et al. | 138—165 |
| 2,354,485 | 7/1944 | Slaughter | 138—165 |
| 2,454,640 | 11/1948 | Eichner | 114—90 |
| 2,924,472 | 2/1960 | Bush. | |
| 3,055,399 | 9/1962 | Bush et al. | 138—157 |
| 3,126,035 | 3/1964 | Espetvedt | 138—162 |

HERBERT F. ROSS, Primary Examiner

U.S. Cl. X.R.

138—156; 285—421